United States Patent
Kim

(10) Patent No.: US 8,589,983 B2
(45) Date of Patent: Nov. 19, 2013

(54) NAVIGATION METHOD OF MOBILE TERMINAL AND APPARATUS THEREOF

(75) Inventor: Nam-Young Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 265 days.

(21) Appl. No.: 12/857,319

(22) Filed: Aug. 16, 2010

(65) Prior Publication Data

US 2011/0088066 A1    Apr. 14, 2011

(30) Foreign Application Priority Data

Oct. 13, 2009   (KR) .................. 10-2009-0097398

(51) Int. Cl.
*H04N 5/445*  (2011.01)
(52) U.S. Cl.
USPC .............................. 725/56; 725/40; 709/218

(58) Field of Classification Search
USPC .............................. 725/37–61; 709/217–232
See application file for complete search history.

(56) References Cited

U.S. PATENT DOCUMENTS

2003/0051246 A1* 3/2003 Wilder et al. ............. 725/49
2005/0076092 A1* 4/2005 Chang et al. ............ 709/217

* cited by examiner

*Primary Examiner* — Annan Shang
(74) *Attorney, Agent, or Firm* — Birch, Stewart, Kolasch & Birch, LLP

(57) ABSTRACT

A method of controlling a television receiver, and which includes receiving, via an input unit, an automatic channel setting command for automatically setting channels; searching, via a processor, television broadcast channels including television airwave and cable channels and media sources different than the television airwave and cable channels; and assigning, via the processor, preset channels to the television broadcast channels and assigning non-preset channels to the media sources found in the searching step.

17 Claims, 14 Drawing Sheets

Fig. 8a

| Channel No. | Channel name | type |
|---|---|---|
| 9 | SBS | airwave |
| 7 | KBS2 | airwave |
| 9 | KBS | airwave |
| 11 | MBC | airwave |
| 13 | EBS | airwave |
| 14 | photo | Hard disk storage contents |
| 15 | music | Hard disk storage contents |
| 16 | video | Hard disk storage contents |
| 17 | DVD player | External device |
| 18 | BD player | External device |
| 19 | Korean movie | Internet |
| 20 | Foreign movie | Internet |
| 21 | Eldest son | Internet |
| 22 | Second son | Internet |
| 23 | Daughter | Internet |

Fig. 8b

| Channel No. | Channel Name | frequency |
|---|---|---|
| 9 | SBS | .* MHz |
| 7 | KBS2 | .* MHz |
| 9 | KBS | .* MHz |
| 11 | MBC | .* MHz |
| 13 | EBS | .* MHz |

Fig. 8c

| Channel No. | Channel Name | Data source |
|---|---|---|
| 14 | photo | c:\pictures |
| 15 | music | c:\musics |
| 16 | video | c:\movies |
| 17 | DVD player | HDMI #1 |
| 18 | BD player | HDMI #2 |
| 19 | Korean movie | http://www.mylgtv.com/kr_movies/... |
| 20 | Foreign movie | http://www.mylgtv.com/ov_movies/... |
| 21 | Eldest son | http://www.mylgtv.com/02xxxx/1/... |
| 22 | Second son | http://www.mylgtv.com/02xxxx/2/... |
| 23 | Daughter | http://www.mylgtv.com/02xxxx/3/... |

NAVIGATION METHOD OF MOBILE TERMINAL AND APPARATUS THEREOF

CROSS-REFERENCE TO A RELATED APPLICATION

This application claims priority to Korean Patent Application No. 10-2009-0097398 filed on Oct. 13, 2009 in Korea, the entire contents of which is hereby incorporated by reference in its entirety.

BACKGROUND OF THE INVENTION

1. Field of the Invention

The present invention relates to a method and corresponding apparatus for assigning channel numbers to multiple media sources.

2. Description of the Related Art

Televisions reproduce and display data received broadcast providers and also reproduce and display data received from a Blu-ray disk (BD) player, a DVD player, set top box, etc. Thus, users can watch their favorite television program while it is being currently broadcast or can watch their favorite program at a later data if the program has been previously recorded. The BD player and DVD player also allow users to play music recorded on a disc such as a CD.

In addition, each of the different components associated with the television such as the BD player has its own remote controller for controlling operations related to its own functions. When a surround sound system is additionally included with the television, there can be as many as three or four separate remote controllers that have to be individually operated. The operation of the multiple components associated with the television is often cumbersome and difficult, especially for older people.

SUMMARY OF THE INVENTION

Accordingly, an object of the present invention is to address the above-noted and other problems.

Another object of the present invention is to provide a method and corresponding apparatus for automatically setting a channel for multiple media sources connected to a television receiver including broadcast airwaves, contents stored on an external device and Internet contents provided from a network provider to allow a viewer to use the general functions of the television receiver by simply manipulating a channel up/down key on the remote controller associated with the television receiver. Thus, users and especially elderly people can more easily use the multiple functions provided with the television receiver.

To achieve these and other advantages and in accordance with the purpose of the present invention, as embodied and broadly described herein, the present invention provides in one aspect a method of controlling a television receiver, and which includes receiving, via an input unit, an automatic channel setting command for automatically setting channels; searching, via a processor, television broadcast channels including television airwave and cable channels and media sources different than the television airwave and cable channels; and assigning, via the processor, preset channels to the television broadcast channels and assigning non-preset channels to the media sources found in the searching step.

In another aspect, the present invention provides a television receiver including an input unit configured to receive an automatic channel setting command for automatically setting channels; and a processor configured to search television broadcast channels including television airwave and cable channels and media sources different than the television airwave and cable channels, and to assign preset channels to the television broadcast channels and assigning non-preset channels to the media sources found while searching.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein:

FIG. 8a is a channel main table illustrating stored channel setting information according to an embodiment of the present invention;

FIG. 8b is a frequency table illustrating stored signal frequencies with respect to broadcast channels according to an embodiment of the present invention;

FIG. 8c is a source table illustrating stored detailed information regarding channels with respect to a contents storage folder of a storage device, an external input signal providing device, and a contents registration folder within a server according to an embodiment of the present invention;

DETAILED DESCRIPTION OF THE PREFERRED EMBODIMENTS

Reference will now be made in detail to the preferred embodiments of the present invention, examples of which are illustrated in the accompanying drawings.

Figure 1:
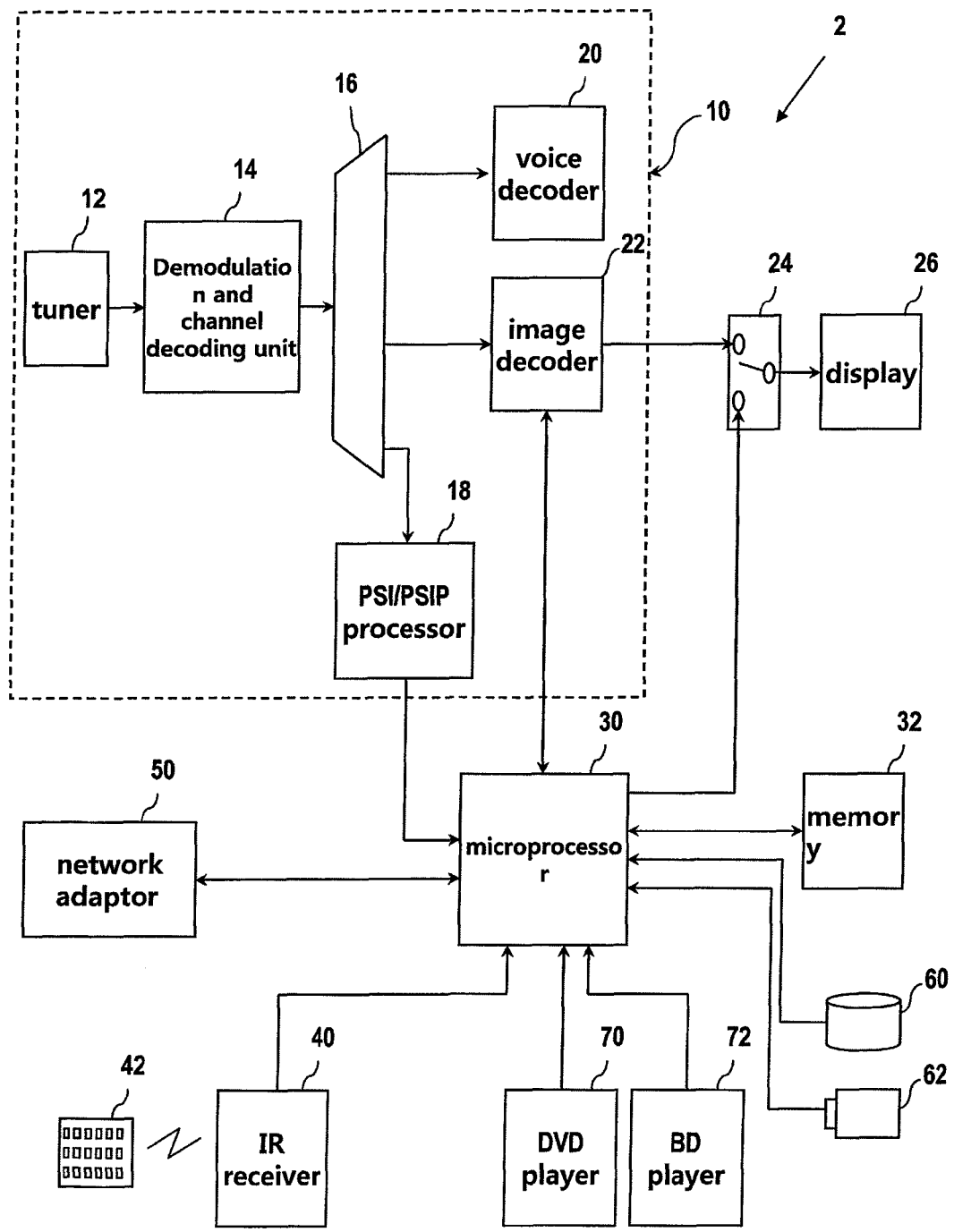
FIG. 1 is a block diagram illustrating a television receiver according to an embodiment of the present invention.

FIG. 1 is a block diagram illustrating a television receiver 2 according to an embodiment of the present invention. As shown, the television receiver 2 includes a TV signal processing unit 10, a microprocessor 30, an infrared ray receiver 40, a network adaptor 50, and a hard disk driver (HDD) 60.

The TV signal processing unit 10 receives a television broadcast signal such as a digital television broadcast signal of an ATSC standard, and restores an image signal included in the broadcast signal. As shown, the TV signal processing unit 10 includes a tuner 12, a demodulation and channel decoder 14, a transport demultiplexer 16, a PSI/PSIP processor 18, a voice decoder 20, and an image decoder 22.

Further, the tuner 12 selects a broadcast signal of one channel selected by the user from among a plurality of broadcast signals input via an antenna or a cable network. The demodulation and channel decoder 14 demodulates the broadcast signal transferred from the tuner 12, performs an error-correction-decoding on the demodulated signal, and outputs a transport stream (TS). In addition, the transport demultiplexing unit 16 demultiplexes the TS to separate a video PES (Packetized Elementary Stream) and an audio PES and extracts PSI/PSIP (Program and System Information Protocol) information. The PSI/PSIP processor 18 receives the PSI/PSIP information from the transport demultiplexing unit 16, parses the received PSI/PSIP information, and stores the parsed information in a memory 32 or a register, so that the microprocessor 30 can reproduce a broadcast based on the information.

Further, the voice decoder 20 depacketizes the audio PES to extract an audio ES and decodes the extracted audio ES to output a digital audio bit stream. The audio bit stream is also converted into an analog audio signal by a digital-to-analog converter, amplified by an amplifier, and then output via a speaker. In addition, the image decoder 22 depacketizes the video PES to extract a video ES and parses the video ES to extract extended/user data and MPEG-2 video bit stream, for example. Also, the image decoder 22 provides the extended/user data to the microprocessor 30, decodes the MPEG-2 video bit stream to restore an image signal, and outputs the restored signal to a display unit 26. The decoding process of the voice decoder 20 and the image decoder 22 may be performed based on a packet ID (PID) checked by the PSI/PSIP processing unit 18.

Further, the microprocessor 30 controls an overall operation of the television receiver 2. In particular, the microprocessor 30 controls a signal processing procedure of the TV signal processing unit 10, an HTTP requesting and responding through the network interface 50, reading and displaying contents stored in the HDD 60, and receiving and displaying of an external input signal from external devices such as a DVD player 70 and a Blu-ray disk (BD) player 72. The operation of the microprocessor 30 and the television receiver may also be controlled by selecting buttons on a manipulation panel or by a signal of a remote controller 42 input via the infrared ray receiver 40.

In addition, the network adaptor 50 enables the television receiver 2 to be connected to the Internet, and may be implemented by, for example, an optical network unit (ONU) or an Ethernet adaptor. The television receiver 2 also stores an address of a supplementary service providing server operated by a receiver manufacturer or a provider affiliated with the receiver manufacturer as an initial connection address. Thus, for the Internet connection, the television receiver 2 can be automatically connected with the supplementary service providing server to access various contents provided by the server. One example of the supplementary service providing server is 'myLGtv (http://www.myLGtv.com).'

Further, the HDD 60 allows the user to store photo images, video, or music files therein that can be later reproduced. Also, the HDD 60 can be used for recording a broadcast program. In particular, the HDD 60 can temporarily store a currently received broadcast program so that the user can view it again a later time by using a so-called 'time machine' or time shifting function. A USB storage device 62 can also be detachably attached to the television receiver 2 so as to allow the user to reproduce photo images, video or music files which are not stored in the HDD 60.

FIG. 1 also illustrates the DVD player 70 and the BD player 72, which are generally not included in the television receiver 2, but rather are separate elements. In more detail, the DVD player 70 can be connected with the television receiver through an external input terminal and used to reproduce a DVD. Similarly, the BD player 72 can be connected with the television receiver through an external input terminal and used to reproduce a BD. Other various external input signal providing devices may also interwork with the television according to an HDMI standard or any other schemes.

In such a television receiver 2 according to an embodiment of the present invention, the user can set contents of the external input signal providing device such as the DVD player 70 and the BD player 72, Internet contents that are accessible via the network adaptor 50, and a broadcast signal as channels. The user can then select a particular channel using a channel up/down key on the remote control, for example.

Figure 2:
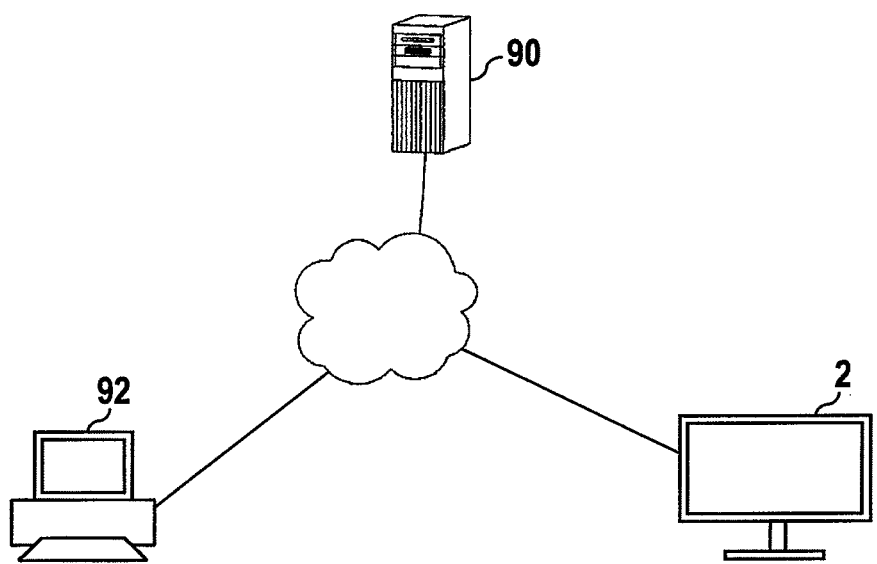
FIG. 2 is an overview illustrating connections among a television receiver, a supplementary service providing server, and a PC according to an embodiment of the present invention.

A supplementary service providing server 90 will now be described in more detail with reference to FIG. 2. In particular, FIG. 2 is an overview illustrating an Internet connection environment of the television receiver 2 with the supplementary service providing server 90, which as discussed above, may be operated by a receiver manufacturer or a provider affiliated with the receiver manufacturer, and provides contents to the television receiver 2. The television receiver 2 is also set to automatically connect with the supplementary service providing server 90 when an Internet connection is attempted. Further, the user of the television receiver 2, the user's family or relatives, etc. can also connect to the supplementary service providing server 90 through the Internet by using a data terminal 92 such as a PC and register contents such as a photo image, video, text, or a combination of contents. The registered contents can then be accessed through the Internet via the television receiver 2.

Figure 3:
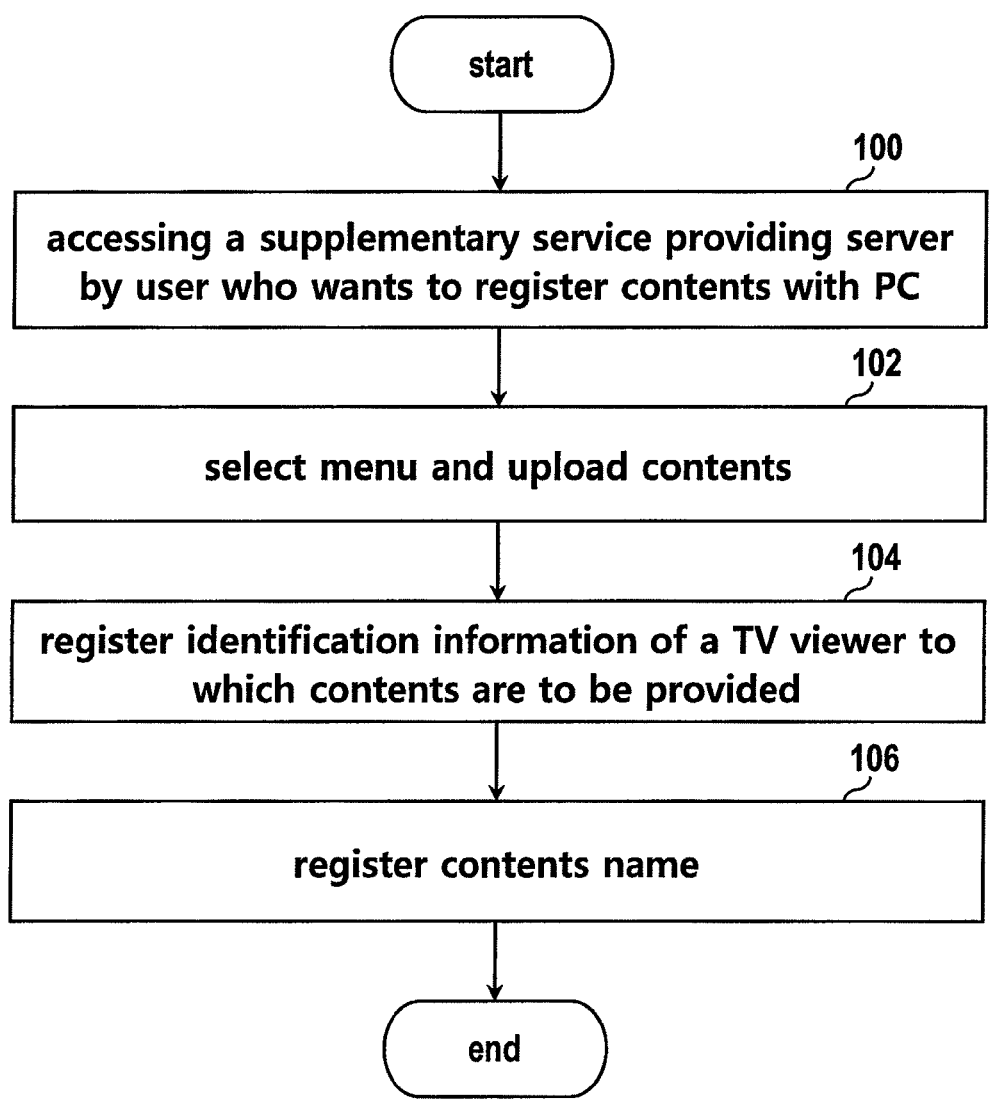
FIG. 3 is a flow chart illustrating a method of registering contents in the PC according to an embodiment of the present invention.
Figure 4:
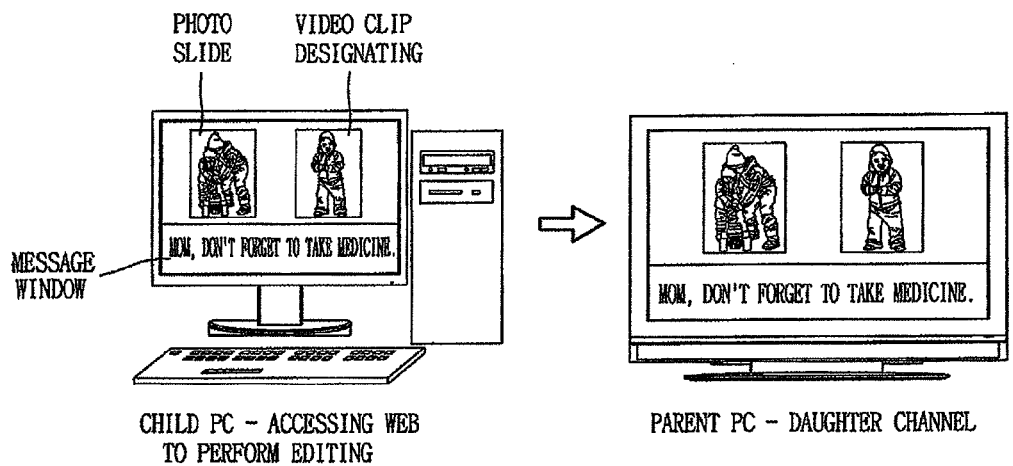
FIG. 4 includes overviews of display screens illustrating a contents registration display screen on the PC according to an embodiment of the present invention.

The process of registering contents will now be described in more detail with reference to FIG. 3. As shown, when the user wants to register contents, the user first accesses the supplementary service providing server 90 using the PC 92 (step 100). Next, the user selects contents to be registered via a contents registration menu. For example, FIG. 4 includes overviews of contents registration display screens. In particular, the left side of FIG. 4 illustrates a contents registration display screen including a photo image, video and text that the user can register on the server 90. Namely, the user can click a photo window present at the left side of an upper portion of the screen to upload a photo image, click a video clip window present at the right side of the upper portion of the screen to upload a video or a video clip, and click a message window present at a lower side of the screen to input a text message (step 102). The photo image, video and text can also be displayed in separate screens.

After the contents have been uploaded, the supplementary service providing server 90 preferably requests identification information regarding a TV viewer who is to receive the corresponding contents, and in response to the request, the user inputs identification information (step 104). In one embodiment, the identification information can be a phone number of the TV viewer. Also, the supplementary service providing server 90 requests the user provide a name of the contents, a folder name, etc., and in response to the request, the user inputs the requested contents name and folder name (step 106). The supplementary service providing server 90 then stores the corresponding contents in a folder of the TV viewer designated by the user.

Figure 5:
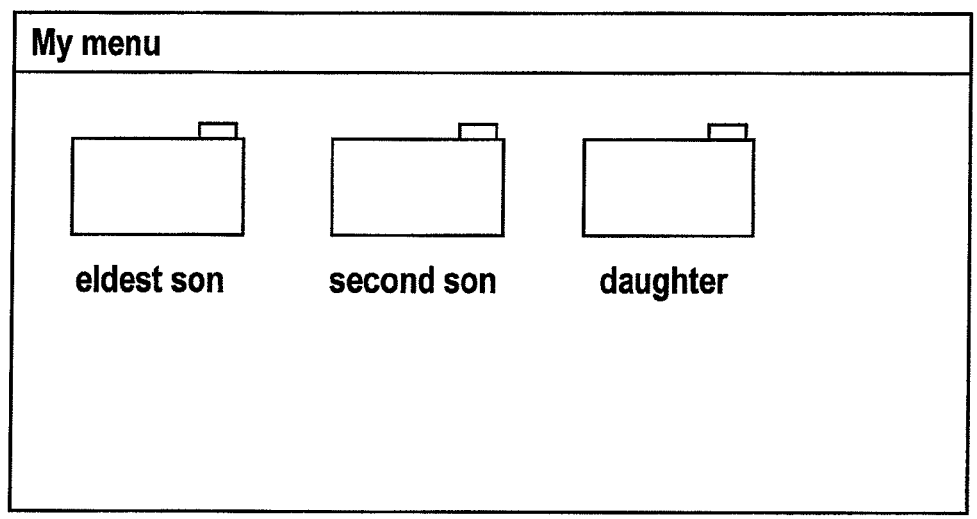
FIG. 5 is an overview of a display screen illustrating personal folders on the supplementary service providing server according to an embodiment of the present invention.

In addition, such contents registration may be performed by several PC users for a single TV. For example, children may register contents individually in order to deliver information to their parents. In more detail, for example, a TV viewer having two sons and one daughter can have registered contents as shown in FIG. 5 including three folders with the names of 'eldest son', 'second son', and 'daughter' in an upper 'my menu' folder. Each folder can then contain contents registered by the children.

FIG. 4 also illustrates a child registering contents and then a parent reviewing the registered contents. As shown in the left side of FIG. 4 and as discussed above, the child registered contents including a photo, a video clip and a text message that is to be viewed at a later time by their parent. As shown in the right side of FIG. 4, the user (parent) can view the registered contents. For example, FIG. 6 is a flow chart illustrating a method of viewing or using the registered contents.

Figure 6:
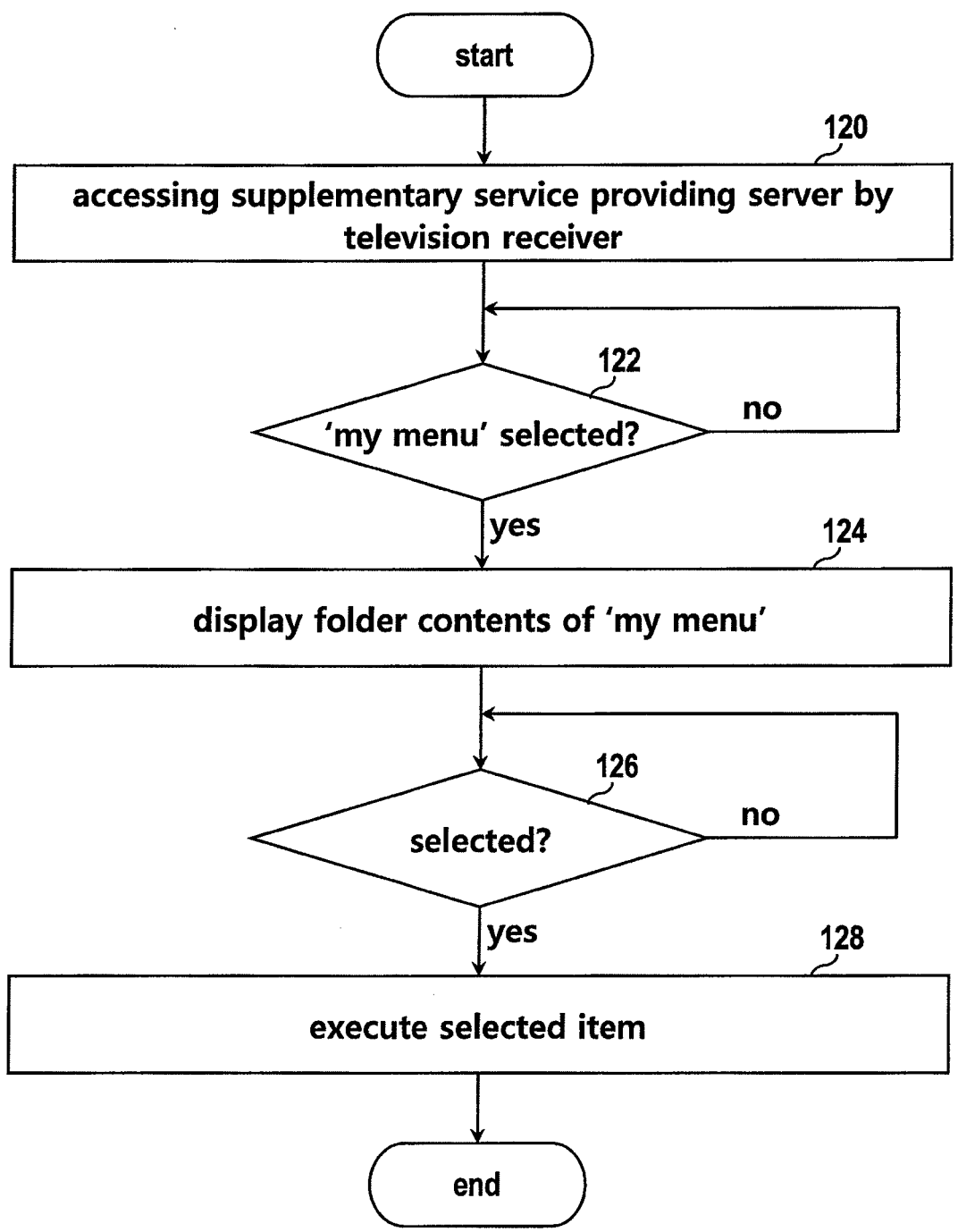
FIG. 6 is a flow chart illustrating a method of displaying assigned contents on the TV according to an embodiment of the present invention.

As shown in FIG. 6, when the user of the television receiver 2 presses an Internet access key, for example, a 'myLGtv' key on the remote controller 42, the television receiver 2 is connected to the supplementary service providing server 90, and the supplementary service providing server 90 displays an initial screen image provided (step 120). In this state, when the user selects a designated menu item, for example, 'my menu' (Yes in step 122), the supplementary service providing server 90 recognizes the television receiver 2 based on an IP address and displays the content of the 'my menu' folder with respect to the corresponding user (step 124). In this instance, when the television receiver 2 first attempts a connection to the 'my menu' folder, the supplementary service providing server 90 can request the identification information with respect to the TV viewer. The identification information can be stored in the memory 32 and used for an automatic authentication in a next session.

Then, when the user selects an item in the folder (Yes in step 126), the selected item is executed (step 128). Namely, when the selected item is a folder, the selected folder is opened, and when the selected item is a URL with respect to contents, an http request with respect to the selected URL is transmitted to the supplementary service providing server 90 and contents received in response to the http request are displayed on the screen of the television receiver 2. As described above, when a parent TV viewer requests contents which have been registered by their daughter, the contents registered by the daughter are displayed on the screen as shown at the right side in FIG. 4.

As mentioned above, the television receiver illustrated in FIG. 1 can reproduce the contents stored in the internal storage device such as the HDD 60 or the USB storage device 62, reproduce an image signal transferred from the external device such as the DVD player 70 and the BD player 72, or download and reproduce the contents registered in the external supplementary service providing server 90, as well as receive and reproduce a broadcast signal. In addition, according to an embodiment of the present invention, all the contents can be assigned as channels such that the user can view contents by simply manipulating the channel up/down key.

Figure 7:
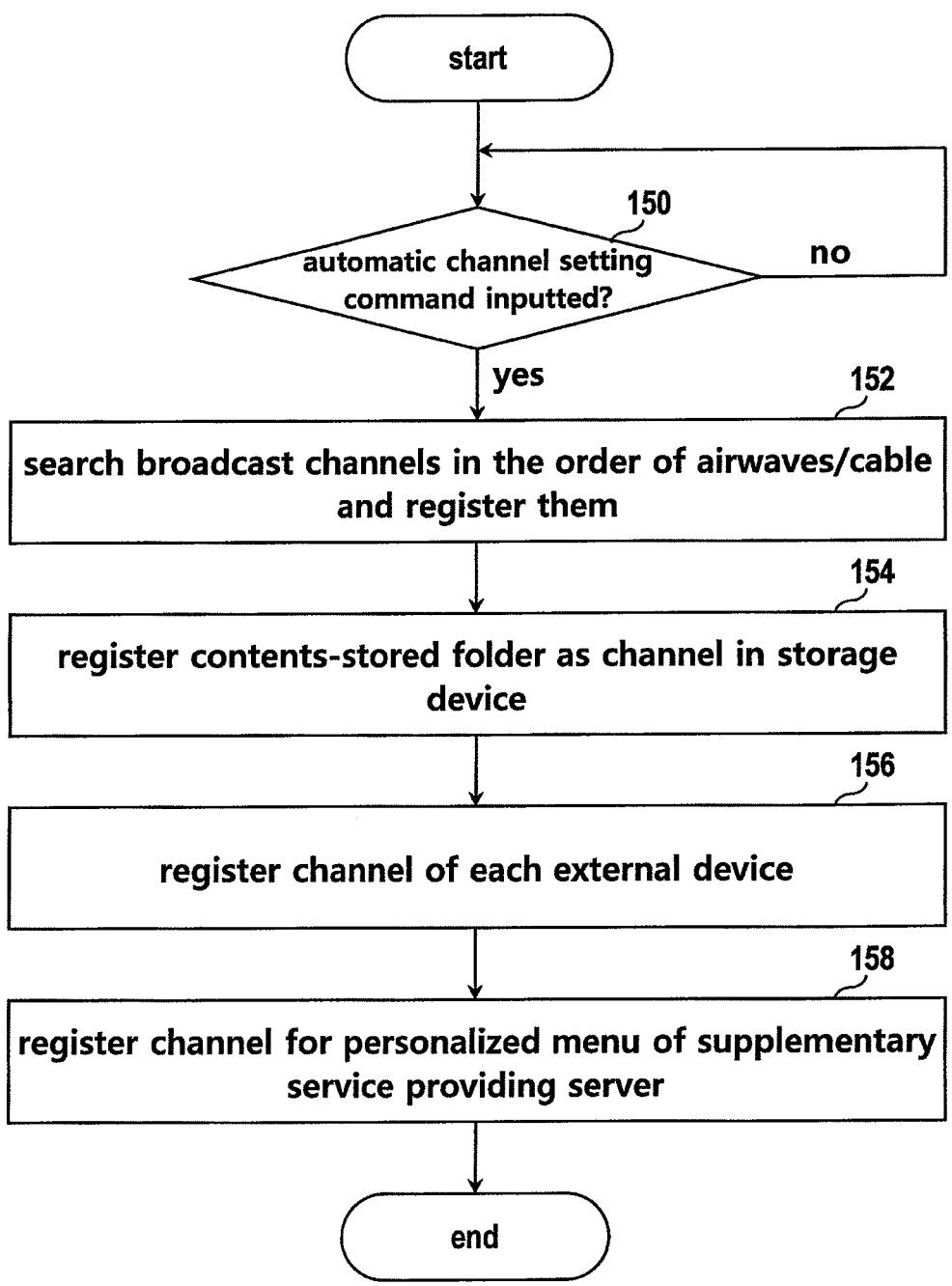
FIG. 7 is a flow chart illustrating a method of automatically setting a channel according to an embodiment of the present invention.

In more detail, FIG. 7 is a flow chart illustrating a method of automatically setting a channel according to an embodiment of the present invention. As shown, the microprocessor 30 continuously monitors whether or not an automatic channel setting command is input (step 150). For example, the user can manipulate a button provided on an outer surface of the television receiver 2 or the remote controller 42 to request contents are assigned channels.

When the microprocessor 30 determines the automatic channel setting command is input (Yes in step 150), the microprocessor 30 searches broadcast channels in an order of an antenna and a cable, for example. Then, whenever a channel having a signal strength larger than a certain reference value is discovered according to the search result, the microprocessor 30 stores the broadcast channel in a channel main table as shown in FIG. 8a and stores a frequency with respect to each channel in a frequency table as shown FIG. 8b (step 152).

Next, the microprocessor 30 searches a folder storing photo image/video/music contents files in the HDD 60 and/or the USB storage device 62, checks attributes of the files stored in the searched folder, stores information regarding each folder in the channel main table as shown in FIG. 8a, and stores accurate position information regarding contents of each folder in a source table as shown in FIG. 8c, thus performing a channel registration process (step 154). In addition, the microprocessor 30 searches an external device connected to the television receiver 2, stores information regarding each of searched devices in the channel main table as shown in FIG. 8a and stores port information regarding each device in the source table as shown in FIG. 8c, thus performing a channel registration process (step 156).

The microprocessor 30 also connects to the supplementary service providing server 90 through the Internet to check a personalized menu stored in the server 90, stores information regarding each menu as shown in the channel main table in FIG. 8a, and stores accurate URL regarding each menu in the source table of FIG. 8c, thus performing a channel registration process (step 158). Also, when performing the steps 152 to 158, the microprocessor 30 can prompt the user to determine whether to perform a corresponding step before performing each step.

Thus, through such channel setting process, the channel main table in FIG. 8a, the frequency table in FIG. 8b, and the source table in FIG. 8c are created. In this state, the viewer can switch to broadcast channels, view contents stored on different devices, etc. by pressing the channel up/down key. That is, the assigned channels can include channels having different physical properties such as a broadcast signal channel, a storage device contents channel, an external input signal channel, an Internet contents channel, and the like.

Figure 9:
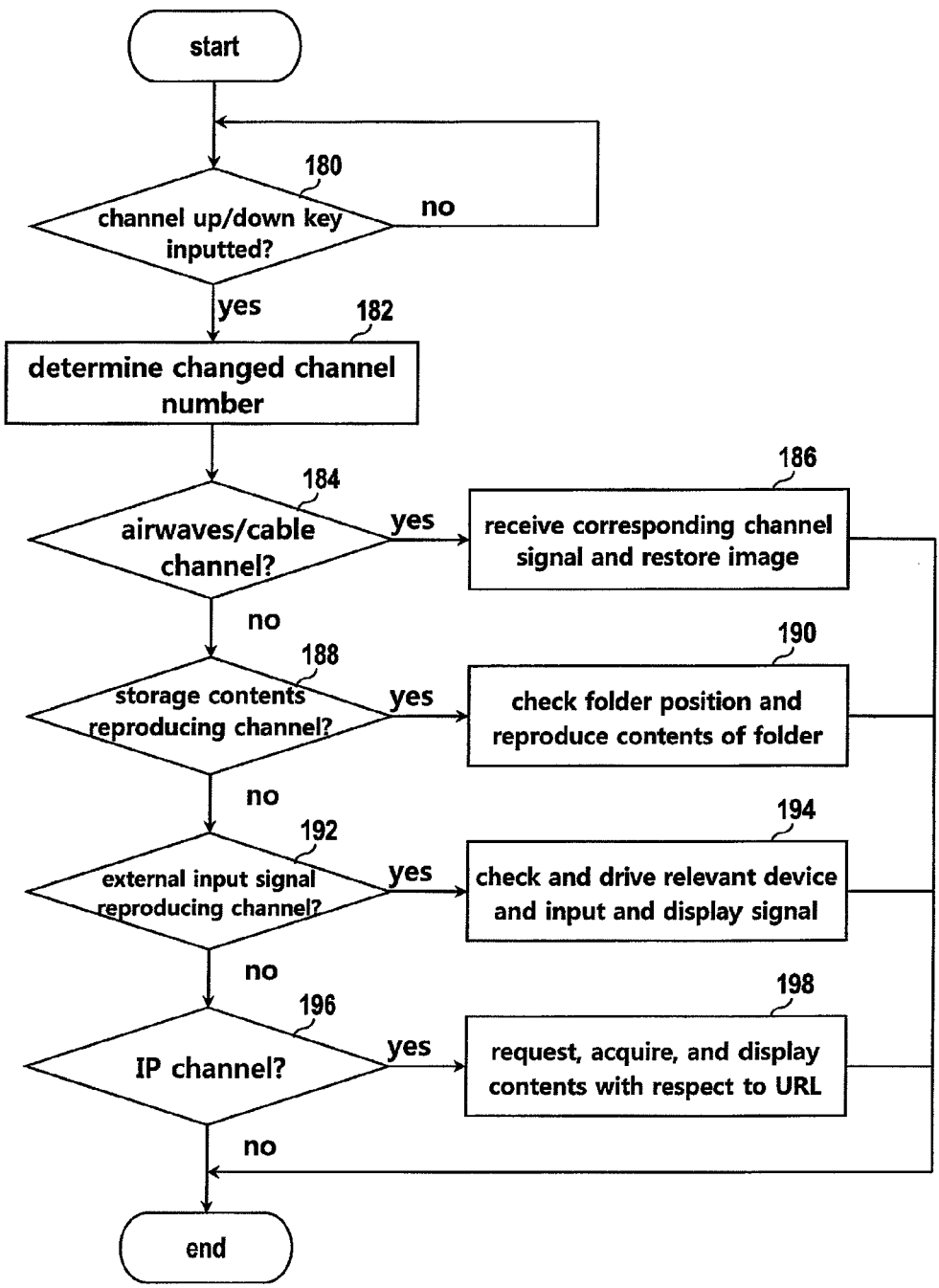
FIG. 9 is a flow chart illustrating a method of reproducing contents based on channel configuration information according to an embodiment of the present invention.

Next, FIG. 9 is a flow chart illustrating a method of reproducing contents based on channel configuration information according to an embodiment of the present invention. As shown, when the viewer presses a channel up key or a channel down key (Yes in step 180), the microprocessor 90 determines a changed channel number according to the key input (step 182). Then, the microprocessor 30 determines whether or not the changed channel is an airwaves channel or a cable channel (step 184). If the microprocessor 30 determines the changed channel is an airwaves channel or a cable channel (Yes in step 184), the microprocessor 30 checks a signal frequency of the corresponding channel with reference to the frequency table of FIG. 8b, and controls the TV signal processing unit 10 to receive a signal of the checked frequency and restores an image. Also, the microprocessor 30 stops reading data from the internal storage device such as the HDD 60 and the USB storage device 62 and releases the Internet connection with respect to the supplementary service providing server 90.

The microprocessor 30 also controls a switch 24 in FIG. 1 to connect the image decoder 22 and a display unit 26 to display the image decoded by the image decoder 22 on the display unit 26 (step 186). Meanwhile, if the changed channel is determined not to be an airwaves or cable channel (No in step 184), the microprocessor 30 determines whether or not the changed channel is a channel for reproducing contents stored in the storage device (step 188). If the changed channel is determined to be a channel for reproducing stored contents (Yes in S188), the microprocessor 30 checks a position of a folder with respect to the corresponding channel in the HDD 60 or the USB storage device 62 with reference to the source table of FIG. 8c, and sequentially reproduces the contents in the folder (step 190). The microprocessor 30 also controls the switch 24 to release the connection between the image decoder 22 and the display unit 26 and switch to receive a signal from the microprocessor 30 to allow reproduced contents to be displayed on the display unit 26.

Also, if the changed channel is determined not to be a stored contents reproducing channel (No in step 188), the microprocessor 30 determines whether or not the changed channel is a channel for reproducing an image signal transferred from an external device (step 192). If the changed channel is determined to be a channel for reproducing an image signal transferred from an external device (Yes in step 192), the microprocessor 30 checks the external device with respect to the corresponding channel with reference to the source table of FIG. 8c. Namely, the microprocessor 30 checks whether or not the external device is the DVD player 70 or the BD player 72. Subsequently, the microprocessor 30 drives the checked device to output a signal, receives the output signal, and displays the signal on the display unit 26 (step 194).

If the changed channel is determined not to be a channel for reproducing an image signal transferred from an external device (No in step 192), the microprocessor 30 determines whether or not the changed channel is an IP channel, namely, a channel for reproducing contents registered to the supplementary service providing server 90 (step 196). If the changed channel is determined to be an IP channel (Yes in step 196), the microprocessor 30 checks a URL with respect to the corresponding channel with reference to the source table of FIG. 8c, transmits an http request with respect to the corresponding URL to the supplementary service providing server 90, and displays contents received in response to the http request on the display unit 26 (step 198). Meanwhile, if the changed channel is determined not to be an IP channel (No in step 196), the microprocessor 90 outputs an error message or guidance message indicating that there is no registered channel, and end the process.

Figure 10A:
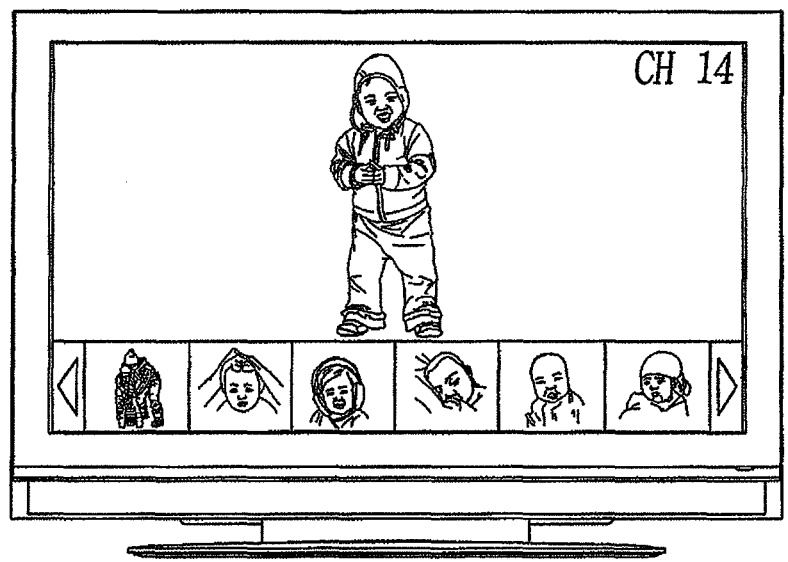
FIG. 10a is an overview of a display screen illustrating reproducing a stored photo image when a user selected channel is a stored photo image reproducing channel according to an embodiment of the present invention.
Figure 10B:
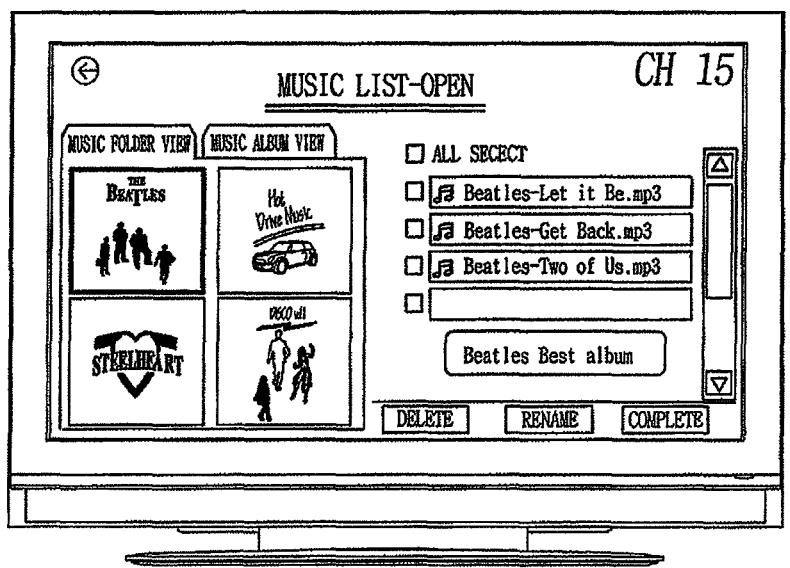
FIG. 10b is an overview of a display screen illustrating reproducing stored music when a user selected channel is a stored music reproducing channel according to an embodiment of the present invention.
Figure 10C:
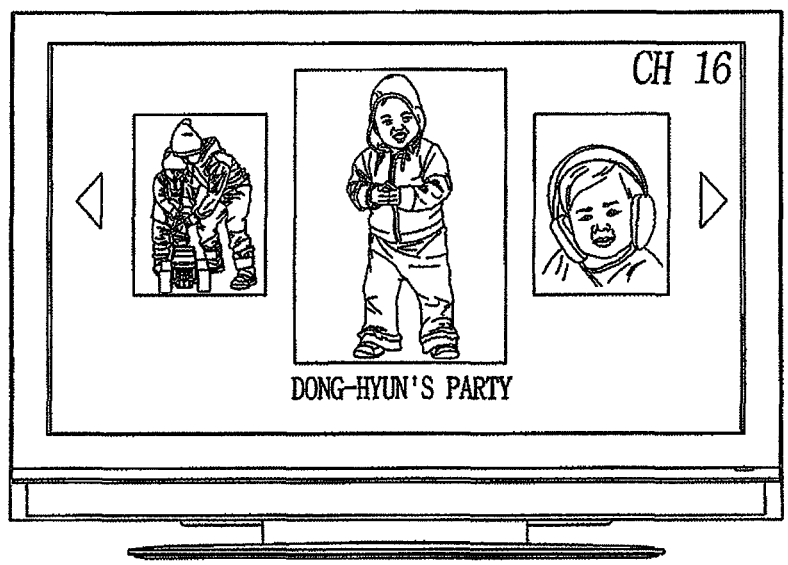
FIG. 10c is an overview of a display screen illustrating reproducing stored video when a user selected channel is a stored video reproducing channel according to an embodiment of the present invention.

Accordingly, when the channel selected by the user through the channel up/down key is a broadcast signal channel (channels 6 to 13 in FIG. 8a), a broadcast signal of the corresponding channel is selected and a broadcast image is reproduced, and when the channel selected by the user is a stored contents reproducing channel, contents in the folder of the HDD 60 or the USB storage device 62 mapped to the corresponding channel number are reproduced. For example, when channel 14 is selected, photo images stored in the HDD 60 are displayed on the screen as shown in FIG. 10a. When channel 15 is selected, music stored in the HDD 60 is displayed on the screen as shown in FIG. 10b. The music can also be played. Also, when channel 16 is selected, video or video clips stored in the HDD 60 are displayed on the screen as shown in FIG. 10c.

In addition, if the channel selected by the user is an external input signal reproducing channel, an external device with respect to the corresponding channel is checked with reference to the source table of FIG. 8c and a signal from the device is reproduced. When the channel selected by the user is an IP channel, a URL with respect to the corresponding channel is checked with reference to the channel main table of FIG. 8a and the source table of FIG. 8c, and contents with respect to the corresponding URL is received and displayed.

Figure 11:
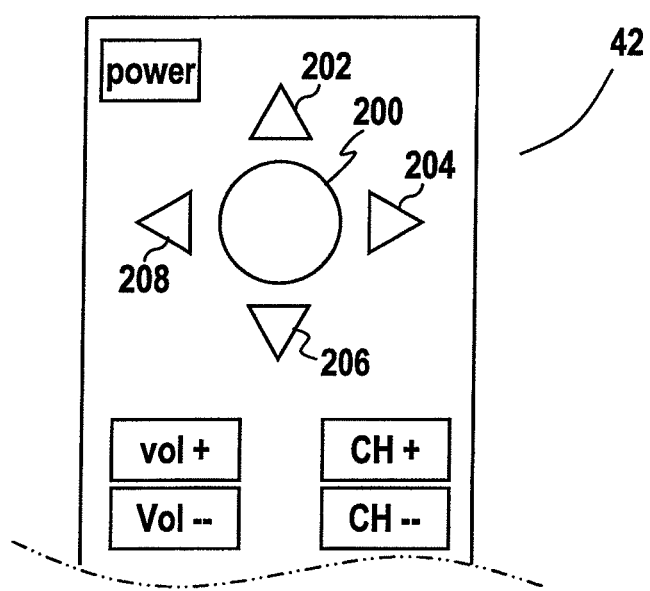
FIG. 11 is a partial overview of a remote controller for implementing a caption magnification function according to an embodiment of the present invention.

In yet another embodiment of the present invention, the user can magnify a portion of contents displayed on the screen of the television receiver 2. To implement this function, the remote controller 42 of the television receiver 2 according to an embodiment of the present invention includes a region magnification key 200 as shown in FIG. 11. The remote controller 42 also includes four direction keys 202 to 208 provided near the region magnification key 200 in order to set a magnification region.

Figure 12:
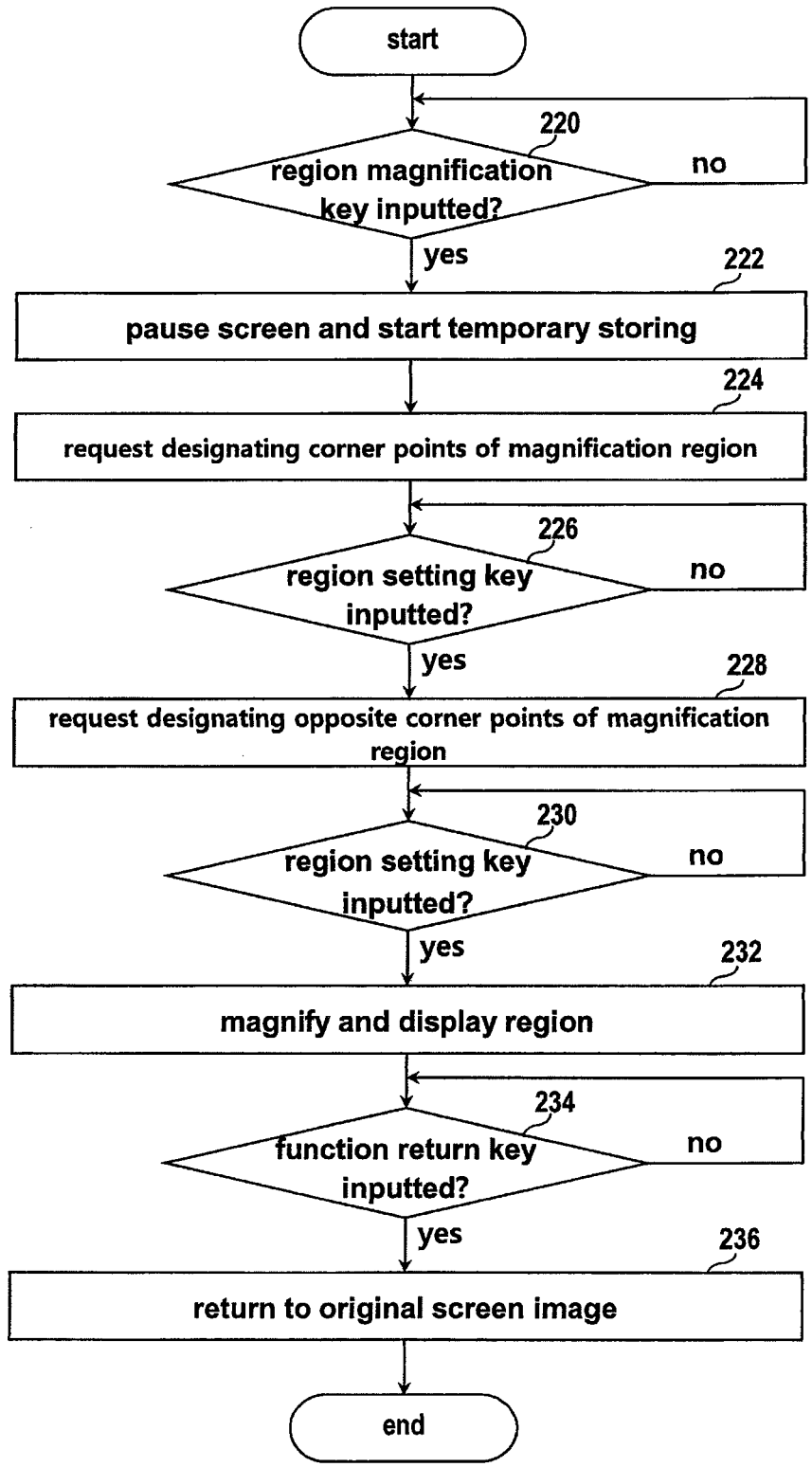
FIG. 12 is a flow chart illustrating a method of magnifying a caption according to an embodiment of the present invention.

Next, FIG. 12 is a flow chart illustrating a method of magnifying a caption of display contents according to an embodiment of the present invention. As shown, the microprocessor 30 determines whether or not the region magnification key 200 is selected (e.g., continuously applied) (step 220). When the region magnification key 200 is selected (Yes in step 220), the microprocessor 30 pauses a screen image displayed on the display unit 26 and stores a broadcast image signal and a voice signal decoded from then on in the HDD 60 (step 222). The microprocessor 30 also temporarily halts or stops a stored contents channel or an IP channel, a request for contents data file with respect to the corresponding channel and a receiving process, and for an external input channel, the operation of a corresponding external device is temporarily stopped.

Subsequently, the microprocessor 30 displays a guidance message instructing the user to designate a corner point at a region desired to be magnified (step 224). For example, the user can designate one corner point of a magnification region by using the four direction keys 202 to 208 and complete designation of the corner point by pressing a region setting key. In particular, the region magnification key 200 can be commonly used as the region setting key. Thus, the microprocessor 30 monitors whether or not the region setting key has been selected or input (step 226).

When the region setting key has been selected (Yes in step 226), the microprocessor 30 displays a guidance message instructing the user designate the opposite corner point of the magnification region (step 228). Again, the user can designate the opposite corner point of the magnification region using the four direction keys 202 to 208 and complete designation of the magnification region by pressing the region setting key.

Figure 13A:
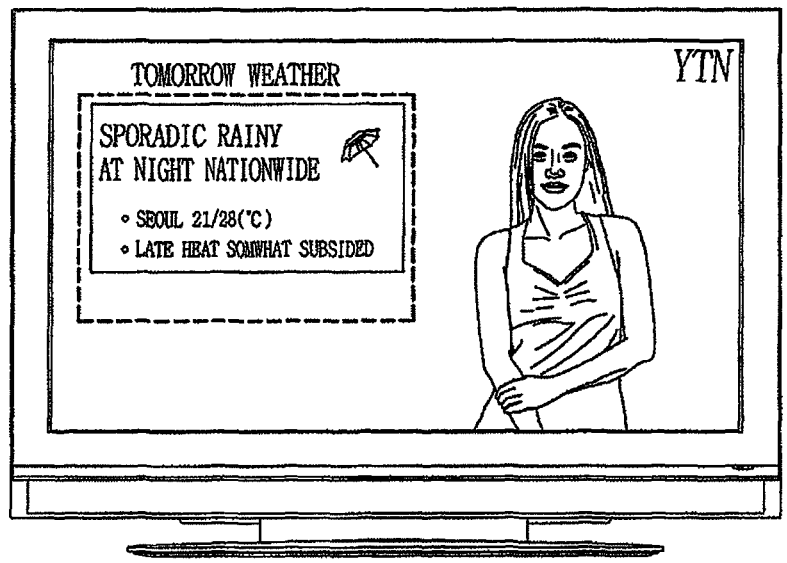
FIG. 13a is an overview of a display screen illustrating designating a magnification region according to an embodiment of the present invention.
Figure 13B:
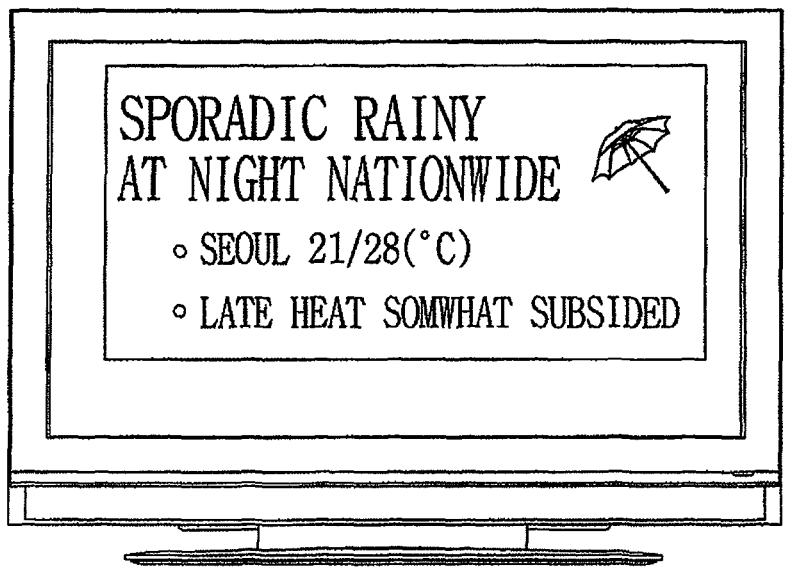
FIG. 13b is an overview of a display screen illustrating magnifying and displaying a portion of a screen according to an embodiment of the present invention.

The microprocessor 30 thus monitors whether or not the region setting key has been selected (step 230). When the region setting key has been selected (Yes in step 230), the microprocessor 30 magnifies the region defined by the two corner points input in steps 226 and 228 and displays the magnified region on the screen (step 232). FIG. 13a illustrates an example of designating a magnification region, and FIG. 13b illustrates an example of a corresponding magnified screen.

Upon checking the content of the magnified screen image, the user can press a function return key to return to the original screen image. Here, the region magnification key 200 may be commonly used as the function return key. The microprocessor 30 then monitors whether or not the function return key is selected (step 234). When the function return key is selected (Yes in step 234), the current screen image is returned to the original screen image (step 236). Also, when the screen image magnification is made while a broadcast image is being reproduced, an image stored in the HDD 60 may be reproduced starting from a point of time when the region magnification key 200 is first pressed or an image decoded at a current time point may be reproduced according to a user selection.

Further, for a stored contents channel, an external input channel, or an IP channel, preferably, an image is reproduced starting from the time point at which the region magnification key 200 is first pressed. The partial screen image magnification function is also useful when a portion of a screen image or a video clip, as well as a caption including an open caption and a closed caption, is desired to be magnified to be viewed.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method of controlling a television receiver, the method comprising:
receiving, via an input unit, an automatic channel setting command for automatically setting channels;
searching, via a processor, television broadcast channels including television airwave and cable channels and at least one media source different from the television airwave and cable channels, wherein the at least one media source includes a plurality of folders;
assigning, via the processor, preset channels to the television broadcast channels and assigning different non-preset channels to each of the plurality of folders included in the at least one media source found in the searching step;
receiving, via the input unit, a display command for displaying a mapping table; and
displaying, via a display unit, the mapping table including information related to the preset channels and the different non-preset channels assigned to each of the plurality of folders,
wherein the mapping table further includes attribute information related to one or more multimedia contents included in each of the plurality of folders.

2. The method of claim 1, wherein the at least one media source includes at least one of a storage device storing multimedia data, a multimedia player and a radio broadcast.

3. The method of claim 2, wherein the storage device includes one of a hard disc drive (HDD), a memory card and a providing server, and the multimedia player includes one of a Blu-ray Disk (BD) player and a DVD player.

4. The method of claim 1, further comprising:
storing, via a memory, the mapping table including the assigned channels with respect to the television broadcast channels and the at least one media source.

5. The method of claim 4, wherein the mapping table includes a list of channel numbers, a list of corresponding channel names and a list of corresponding types of the channel numbers including the television broadcast channels and the at least one media source.

6. The method of claim 5, wherein when the channel number corresponds to the at least one media source, the mapping table further includes an address or location information of at least one or more multimedia contents stored on the at least one media source, and when the channel number corresponds to airwave and cable channels, the mapping table further includes frequency information regarding each channel.

7. The method of claim 1, further comprising:
registering, by a first user, multimedia contents stored on the at least one media source to be viewed by a second user different than the first user;
receiving, via the input unit, a selection signal indicating the second user is requesting a channel change to the multimedia contents stored on the at least one media source; and
displaying or executing the multimedia contents registered by the first user such that the second user views the multimedia contents registered by the first user.

8. The method of claim 1, further comprising:
receiving, via the input unit, a channel change command for changing a current channel to a new channel;
determining, via the processor, if the new channel is a channel assigned to a corresponding media source or if the new channel is a channel assigned to a corresponding television broadcast channel including the airwave and cable channels; and
accessing and reproducing, via the processor, multimedia contents stored on the media source if the determining step determines the new channel is the channel assigned to the corresponding media source, and tuning a tuner to a frequency of the channel assigned to the corresponding television broadcast channel so as to receive and display the corresponding television broadcast channel if the determining step determines the new channel is the channel assigned to the corresponding television broadcast channel.

9. A television receiver, comprising:
an input unit configured to receive an automatic channel setting command for automatically setting channels; and
a processor configured to:
search television broadcast channels including television airwave and cable channels and at least one media source different from the television airwave and cable channels, wherein the at least one media source includes a plurality of folders,
assign preset channels to the television broadcast channels, assign different non-preset channels to each of the plurality of folders included in the at least one media source found while searching receive a display command for displaying a mapping table, and display, via a display unit, the mapping table including information related to the preset channels and the different non-preset channels assigned to each of the plurality of folders, wherein the mapping table further includes attribute information related to one or more multimedia contents included in each of the plurality of folders.

10. The television receiver of claim 9, wherein the at least one media source include at least one of a storage device storing multimedia data, a multimedia player and a radio broadcast.

11. The television receiver of claim 10, wherein the storage device includes one of a hard disc drive (HDD), a memory card and a providing server, and the multimedia player includes one of a Blu-ray Disk (BD) player and a DVD player.

12. The television receiver of claim 9, further comprising:
a memory configured to store the mapping table including the assigned channels with respect to the television broadcast channels and the at least one media source.

13. The television receiver of claim 12, wherein the mapping table includes a list of channel numbers, a list of corresponding channel names and a list of corresponding types of the channel numbers including the television broadcast channels and the at least one media source.

14. The television receiver of claim 13, wherein when the channel number corresponds to the at least one media source, the mapping table further includes an address or location information of at least one or more multimedia contents stored on the at least one media source, and when the channel number corresponds to airwave and cable channels, the mapping table further includes frequency information regarding each channel.

15. The television receiver of claim 9, wherein the input unit is further configured to receive a registering signal indicating registering, by a first user, of multimedia contents stored on the at least one media source to be viewed by a second user different than the first user, and to receive a selection signal indicating the second user is requesting a channel change to the multimedia contents stored on the at least one media source, and wherein the controller is further configured to display or execute the multimedia contents registered by the first user such that the second user views the multimedia contents registered by the first user.

16. The television receiver of claim 9, wherein the input unit is further configured to receive a channel change command for changing a current channel to a new channel, and wherein the processor is further configured to determine if the new channel is a channel assigned to a corresponding media source or if the new channel is a channel assigned to a corresponding television broadcast channel including the airwave and cable channels, and to access and reproduce multimedia contents stored on the media source if the new channel is determined to be the channel assigned to the corresponding media source, and to tune a tuner to a frequency of the channel assigned to the corresponding television broadcast channel so as to receive and display the corresponding television broadcast channel if the new channel is determined to be the channel assigned to the corresponding television broadcast channel.

17. The television receiver of claim 9, wherein the processor is further configured to check attributes of the one or more multimedia contents included in each of the plurality of folders, and to store the attribute information including the checked attributes to the mapping table.

\* \* \* \* \*